(12) United States Patent
Lee

(10) Patent No.: US 7,112,767 B2
(45) Date of Patent: Sep. 26, 2006

(54) CONTROLLING APPARATUS OF AN ELECTRIC OVEN AND CONTROLLING METHOD OF THE SAME

(75) Inventor: Byeong Yong Lee, Changwon-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 10/524,412

(22) PCT Filed: Jul. 13, 2004

(86) PCT No.: PCT/KR2004/001728

§ 371 (c)(1),
(2), (4) Date: Feb. 14, 2005

(87) PCT Pub. No.: WO2005/008136

PCT Pub. Date: Jan. 27, 2005

(65) Prior Publication Data

US 2005/0247695 A1     Nov. 10, 2005

(30) Foreign Application Priority Data

Jul. 18, 2003  (KR) ............... 10-2003-0049438

(51) Int. Cl.
*H05B 1/02* (2006.01)
(52) U.S. Cl. ............... 219/492; 219/497; 219/412; 99/325

(58) Field of Classification Search ............... 219/492, 219/494, 497, 499, 501, 507, 508, 483–486, 219/411–414; 99/325, 331–333
See application file for complete search history.

(56) References Cited

U.S. PATENT DOCUMENTS

| 4,507,546 A | * | 3/1985 | Fortune et al. ............ 219/497 |
| 4,883,944 A | * | 11/1989 | Takano et al. ............. 219/492 |
| 5,325,822 A | * | 7/1994 | Fernandez ................. 392/491 |
| 5,352,865 A | * | 10/1994 | Burkett et al. ............. 219/486 |
| 5,723,847 A | * | 3/1998 | Boldt ....................... 219/506 |
| 5,744,783 A |   | 4/1998 | You |

FOREIGN PATENT DOCUMENTS

| JP | 7-217896 A | 8/1995 |
| KR | 1996-11269 A | 4/1996 |
| KR | 1997-75697 A | 12/1997 |
| KR | 1998-57988 A | 9/1998 |
| KR | 2000-18120 A | 4/2000 |

* cited by examiner

*Primary Examiner*—Mark Paschall
(74) *Attorney, Agent, or Firm*—Birch, Stewart, Kolasch & Birch, LLP

(57) ABSTRACT

Disclosed are apparatus and method for controlling an electric oven, capable of operating heaters in an optimized state by changing a heater-on time of the heater in an operation interval of the heater which is periodically turned on/off.

31 Claims, 3 Drawing Sheets

CONTROLLING APPARATUS OF AN ELECTRIC OVEN AND CONTROLLING METHOD OF THE SAME

TECHNICAL FIELD

The present invention relates to an electric oven, and particularly to apparatus and method for controlling an electric oven, which control a heater of the electric oven so that a suitable temperature may be kept in the oven with supplying electricity in an optimized state. More particularly, the present invention relates to apparatus and method for controlling an electric oven, which are capable of keeping an optimized electricity supplying state and an optimized temperature state for the oven by controlling an on-time of the heater at which the heater is turned on.

BACKGROUND ART

Generally, an electric oven is a utensil for keeping a temperature in a cavity suitably by heating of a heating wire. In particular, a plurality of heaters are prepared at upper, lower and side surfaces in the cavity so that the inside of the cavity may be three-dimensionally heated. Furthermore, a magnetron may be additionally installed to one side of the inner circumference of the cavity so that foods are cooked by electronic waves generated by the magnetron.

In the electric oven, the most important thing is to keep a temperature in the cavity at a desired level. In order to keep a suitable temperature in the cavity as mentioned above, a plurality of heaters are generally repeatedly turned on and off. For example, if a current temperature in the cavity is not higher than a set temperature, the heaters are turned on/off at a set interval so that the inside of the cavity is heated up to the set temperature. On the while, if a current temperature is higher than the set temperature, the heaters are turned off, not to give heat into the cavity.

However, since the conventional heat controlling method controls the oven by turning off the heaters if a temperature in the cavity is high, but turning on/off the heaters at a set interval if the temperature in the cavity is low, there may be caused local overheating. In addition, since the electricity is instantly turned on/off, a breaker switch may be turned off.

Moreover, since the heaters are operated at a predetermined fixed period, it is impossible to accurately satisfy an optimal operating condition suitable for various circumstances. In more detail, as an example, if a temperature in the cavity is approaching a set temperature, a heater with small heating capacity is generally operated, but even in this case, the heating capacity should be controlled in consideration of an amount of the foods received in the cavity. However, since the heaters operated at a given interval, the temperature in the cavity may be continuously decreased due to their small capacity when a lot of foods are received in the cavity. On the while, if an amount of foods is small, the heater may be so frequently turned off, thereby probably causing a problem in the circuit of the electric oven or the domestic circuit breaker.

DISCLOSURE OF THE INVENTION

The present invention is designed to solve the problems of the prior art, and therefore an object of the invention is to provide apparatus and method for controlling an electric oven, which are capable of controlling an inner temperature of the electric even to an optimized state by making a heater operation interval and a heat-on time be variable according to a temperature in a cavity of the electric oven when heaters in the electric oven are controlled.

In addition, the present invention is directed to providing apparatus and method for controlling an electric oven, which keep a suitable temperature in the cavity of the electric oven with the use of many heaters by turning on a heater giving much influence on the temperature at a low temperature so that the temperature reaches a desired level within a short time and turning on a heater giving small influence on the temperature when it is desired to keep a suitable temperature.

In addition, the present invention is directed to providing apparatus and method for controlling an electric oven with the use of many heaters, which are capable of controlling the heaters always in an optimized state by operating the heaters in an alternate and simultaneous manner in consideration of electric power.

In order to accomplish the above object, the present invention provides an apparatus for controlling an electric oven, which includes a key manipulation unit for manipulation of the electric oven; a controller for controlling a temperature in a cavity of the electric oven to a set temperature according to a signal of the key manipulation unit; and at least one heater operated at a predetermined heating on/off interval by means of the controller, a heater-on time in the heating on/off interval of the heater being changed at a predetermined period with comparing a current temperature in the cavity with the set temperature.

In another aspect of the invention, there is provided a method for controlling an electric oven, which includes the steps of comparing a current temperature in the electric oven and a set temperature; and heating the electric oven by turning on/off at least one heater at a predetermined interval, wherein a heater-on time of the heater is elongated according to a temperature difference obtained in the comparing step.

In still another aspect of the invention, there is also provided an apparatus for controlling an electric oven, which includes a key manipulation unit for manipulation of the electric oven; at least one heater formed in the electric oven; and a controller for operating the heater according to a signal of the key manipulation unit so that the heater is turned on/off at a predetermined interval, and changing a heater-on time of the heater in the heating on/off interval according to a difference between a current time in the electric oven and a set temperature.

By using the present invention, the electric oven may always keep a temperature in the cavity of the electric oven into an optimized state. Particularly, the internal state of the cavity may be kept in an optimized state regardless of an amount of foods in the cavity or a set temperature.

In addition, since the heaters may be turned on/off in an optimized state suitable for the temperature state in the cavity, the electric oven which consumes high electric power may be operated in an optimized electric power state.

Moreover, since the electric oven is operated with an optimized electric power, the power interruption problem may be solved. In particular, the power supply in the oven may be safely operated, and malfunction of the oven may be prevented.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

BEST MODE FOR CARRYING OUT THE INVENTION

Hereinafter, preferred embodiments of the present invention will be described in detail with reference to the accompanying drawings.

Figure 1:
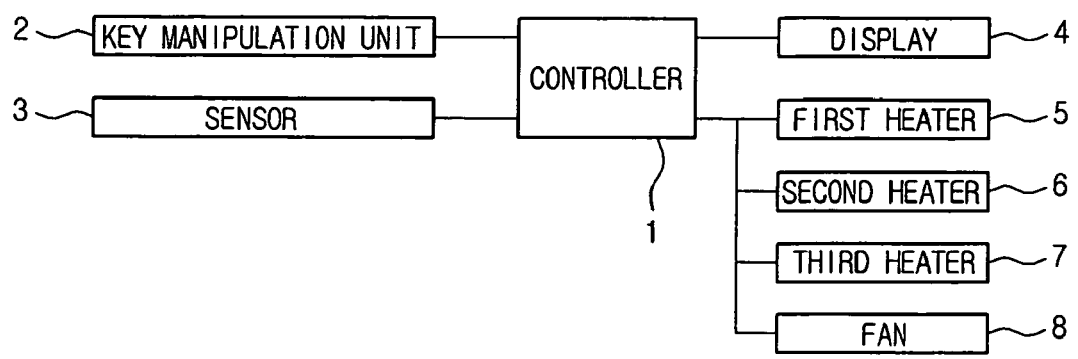
FIG. 1 is a block diagram showing an electric oven according to one embodiment of the present invention.

FIG. 1 is a block diagram showing an electric oven according to one embodiment of the present invention.

Referring to FIG. 1, the electric oven according to the spirit of the present invention includes a key manipulation unit 2 for manipulating operation of the electric oven by manipulation of a user, a sensor 3 for detecting humidity or temperature of foods, a controller 1 which stores an automatic cooking control program and various cooking data in advance and controls the overall operation of the electric oven according to a sensing signal of the sensor 3, a display 4 for displaying a control state of the electric oven by control of the controller 1, first, second and third heaters 5, 6 and 7 operated by control of the controller 1, and a fan 8 for cooling of electric components and convection inside a cavity of the electric oven.

In detail, the electric oven of the present invention is configured as follows.

A temperature control function key provided on the key manipulation unit 2 may be used for simultaneously designating temperature and humidity in the cavity by one pushing, and it is also possible that a temperature control key and a humidity control key are independently provided. In addition, the sensor 3 is a temperature sensor positioned at any point in the cavity, and one or more sensor may be used for measuring a temperature in the cavity. The display 4 may display temperature/humidity in the cavity, an operation state of the electric oven, or a cooking state designated in the electric oven. The fan 8 may include a cooling fan for electric components in the electric oven and a convection fan in the cavity, and the fan 8 is controlled by the controller 1.

In addition, the heaters 5, 6 and 7 may be arranged so that a heater giving more influence on temperature is positioned at an upper portion of the cavity and a heater giving less influence on temperature is positioned around the cavity. By such arrangement, a plurality of heaters may be suitably controlled according to their influence on temperature, and a temperature in the cavity may also be managed suitably.

In addition, the controller 1 allows the sensor 3 to sense an operating state of the electric oven and also makes the electric oven be controlled into a suitable state by means of an instruction input by the key manipulation unit 2. Moreover, the controller 1 generates and transmits a predetermined operating signal so that the display 4, the heaters 5, 6 and 7 and the fan 8 may be operated suitably.

Now, operation of the electric oven according to the present invention will be described.

If a user selects a temperature control function key through the key manipulation unit 2, in case the controller 1 turns on/off one heater, the controller 1 changes and controls a heater control period and a heater-on time so that a temperature in the electric oven may be optimized as desired within the minimum time. In addition, in case the controller 1 turns on/off several heaters, the controller 1 makes 'a full on' for turning on all heaters such as the first heater 5, the second heater 6 and the third heater 7 if the temperature in the cavity is low, while the controller 1 turns on the small number of heaters or makes the heater-on time to the minimum so that the temperature in the electric oven may be controlled to an optimized state if the temperature in the cavity is high. That is to say, in case of turning on/off several heaters, the controller 1 turns on a heater giving much influence on temperature in an initial stage at a low temperature so that the temperature may reach a desired level, while the controller 1 turns on/off a heater giving small influence on temperature when it is required to keep a proper temperature.

In addition, in case several heaters are turned on/off by the controller 1, the heaters 5, 6 and 7 are operated alternately or simultaneously in consideration of the electric power so that a room circuit breaker is not turned off due to abrupt change of an excess current, and the temperature in the cavity may be controlled into an optimized state within a minimum time.

Meanwhile, the present invention has a distinctive feature in a way of controlling the heaters 5, 6 and 7. That is to say, when the heaters 5, 6 and 7 are controlled, a heater-on time is not fixed but changed according to a temperature in the cavity. For example, if the temperature in the cavity is high, the heater-on time of the heaters 5, 6 and 7 is elongated so that more heat is applied into the cavity, while, if the temperature in the cavity is near a set temperature and not so much heat is needed, the heater-on time of the heaters 5, 6 and 7 is shortened so that a suitable amount of heat is applied into the cavity. Adjusting the heater-on time of the heaters as mentioned above may be called 'a heater cycle control algorithm'.

In addition, in case a plurality of heaters are used in the electric oven, a different control method may be used. That is to say, if a large amount of heat is required since the temperature in the cavity is significantly different from the set temperature desired by a user at an initial heating stage, a large number of heaters are turned on so as to apply a large amount of heat into the cavity. However, if the temperature in the cavity is approaching the set temperature, a small number of heaters are turned on so as to apply a small amount of heat into the cavity.

As mentioned above, an individual cycle control algorithm and a selective operation of the heater may be conducted for each heater according to the difference between the set temperature and the temperature in the cavity, and such selective operation of the heaters may make the temperature and/or humidity state in the cavity into an optimized state within a shortest time.

Figure 2:
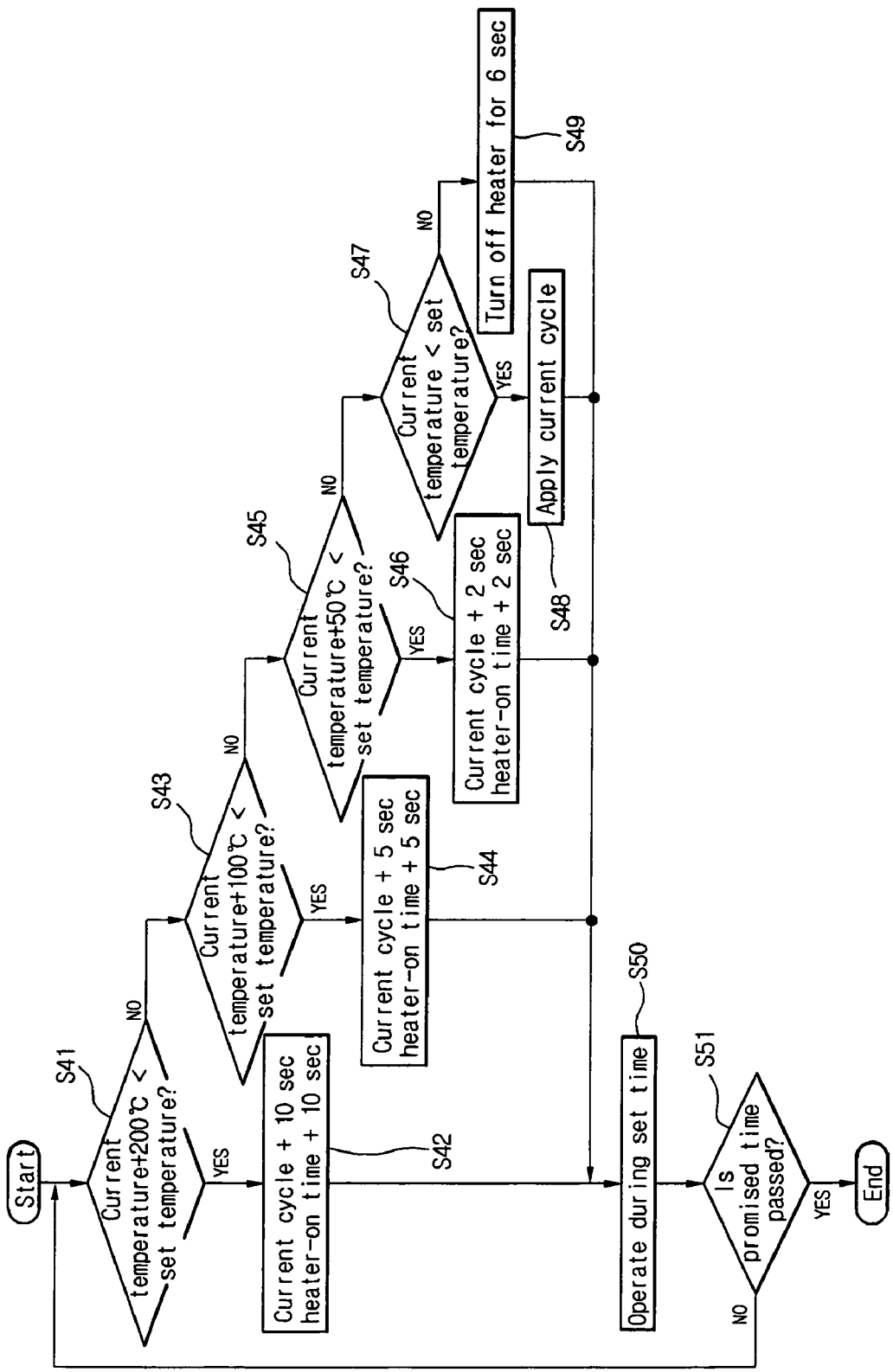
FIG. 2 is a flowchart for illustrating a method for controlling the electric oven according to the present invention.

FIG. 2 is a flowchart for illustrating the method for controlling the electric oven according to the present invention. The electric oven controlling method according to this embodiment proposes a heater cycle control algorithm which variably controlling the heater control cycle and the heater-on time in order to control the temperature in the electric oven into a desired state within a shortest time.

Referring to FIG. 2, it is determined at first whether a current temperature in the cavity is lower than the set temperature over 200° C. (S41). If it is, 10 seconds are added to the current heater operation cycle and the heater-on time is also added by 10 seconds (S42) so that the temperature in the cavity may reach a suitable temperature within a shortest time. The time extended in the operation cycle of the heater means that the heater-on time is extended. Thus, it may be considered that the heater-on time is elongated while a heater-off time is kept as it is, and this resultantly increases a heating capacity of the heater. Of course, a process of setting a set temperature and/or a set time by a user is conducted in advance before comparison between the temperature in the cavity and the set temperature. In order to set the set temperature, the user may push a dial button or a cooking button programmed in advance, or use various other ways.

With the heater-on time being extended, the heater is operated during the set time (S50). Then, it is determined whether a promised time for cooking foods is passed (S51). If the promised time is not passed, the process is returned to the step of comparing a current temperature in the cavity with the set temperature (S41), thereby conducting the electric oven controlling method of the present invention continuously. Of course, if the cooking time is passed, the electric oven controlling method is not conducted any more, but finished.

Meanwhile, the heater operating step (S50) may be accomplished during a predetermined time. If an operation time of the heater is too long, the temperature in the cavity may be not controlled rapidly. On the while, if the operation time of the heater is too short, the electricity consumed may be too abruptly changed. Thus, it is preferable that the heater operating step (S50) is continued for about 1 minute. In addition, the cooking time may be set in advance in the step of determining whether the cooking time is passed (S51), set individually by the user, or previously acknowledged according to the preset program.

And then, it is determined whether a current temperature in the cavity is higher than 200° C. below the set temperature but lower than 100° C. of the set temperature (namely, the current temperature+100° C.<the set temperature<the current temperature+200° C.) (S43). If it is, the heater operation cycle and the heater-on time are shortened since the temperature difference has been decreased. In more detail, 5 seconds are added to the cycle and the heater-on time is also added by 5 seconds (S44). After that, the heater operating step (S50) is conducted, and whether the cooking time is passed is determined.

In addition, it is also determined whether a current temperature in the cavity is lower than the set temperature as much as about 50° C. (namely, the current temperature+50° C.<the set temperature<the current temperature+100° C.) (S45). If it is, 2 seconds are added to the current cycle and the heater-on time is also added by 2 seconds (S46). After that, the heater operating step (S50) is conducted, and whether the cooking time is passed is determined.

And then, it is determined whether a current temperature in the cavity is less than the set temperature in the range less than 50° C. (S47). If it is, the heater operation cycle currently applied is kept as it is so that the heater is operated continuously (S48). In addition, if a current temperature in the cavity is higher than the set temperature, the heater is turned off for about 6 seconds (S49). Since the heater turns off, the current temperature in the cavity may be lowered below the set temperature. Of course, if the heater is turned off for a predetermined time, the heater is operated according to the current heater operation cycle (S50), whether the promised time is passed is determined (S51), and then the operation of the electric oven is accomplished continuously.

Meanwhile, it is also possible that the heater-off time is changed when a current temperature in the cavity is higher than the set temperature according to the difference between the current temperature and the set temperature so that the temperature in the cavity may be more suitably controlled. For example, if the heater is turned off for 6 seconds when a current temperature in the cavity is higher than the set temperature as much as 10° C., the heater may be turned off for 12 seconds when the temperature difference is 20° C. It may be easily expected that the heater may be turned off for a longer time if the temperature difference is larger.

This electric oven controlling method may continuously control the electric oven by repeatedly executing the step of determining whether it reaches the promised time (S51).

For example, if the current heater cycle turns on the heater for 5 seconds and turns off the heater for 5 seconds, the current temperature in cavity is 50° C. and the set temperature is 300° C., after the heater cycle control algorithm of the present invention is passed once, the heater-on time becomes 15 seconds and the heater-off time becomes 5 seconds due to the comparison step (S41) and the cycle changing step (S42). In addition, after the heater is operated once according to the cycle (heater-on 15 seconds and heater-off 5 seconds) during the heater operating step (S50), the heater cycle control algorithm is accomplished once again. At this time, if a current temperature in the cavity is 80° C., the heater-on time becomes 25 seconds and the heater-off time becomes 5 seconds due to the comparison step (S41) and the cycle changing step (S42). By executing the steps repeatedly, the heater may be operated with continuously changing the heater operation cycle toward an optimized state.

In addition, classification of temperature in the cavity and a time added to the heater operation cycle described in this embodiment are just one example, and they may be suitably modified according to a detail specification of the electric oven and a capacity of the heater. However, the spirit of the present invention that a temperature in the cavity may be rapidly and suitably changed and controlled by continuously changing the heater operation cycle by means of the step of comparing the current temperature in the cavity with the set temperature should be not changed. The heater controlling method which actively changes the heater operation cycle by comparing the current temperature in the cavity with the set temperature may be called 'a heater cycle control algorithm'. Furthermore, if the difference between the current temperature in the cavity and the set temperature is decreased less than a certain level, the heater operation cycle may be even decreased so as to prevent foods from being spoiled.

Meanwhile, in case the controller of the electric oven turns on/off several heaters in such a way, the controller may turns on all of heaters (e.g., first, second and third heaters) when a temperature in the cavity is far lower than the set temperature (which is called 'full on'), while, if the temperature in the cavity is high, the controller may reduce the heater operation cycle and shortens the heater-on time to the minimum so that the temperature in the electric oven may be controlled to its optimized state. In the same point of view, in case the controller turns on/off several heaters, the controller may turn on a heater giving much influence on temperature firstly so that the temperature is increased up to a desired level within a shortest time, while the controller may turn on a heater giving less influence on temperature when the temperature in the electric oven should be kept at a suitable temperature.

Figure 3:
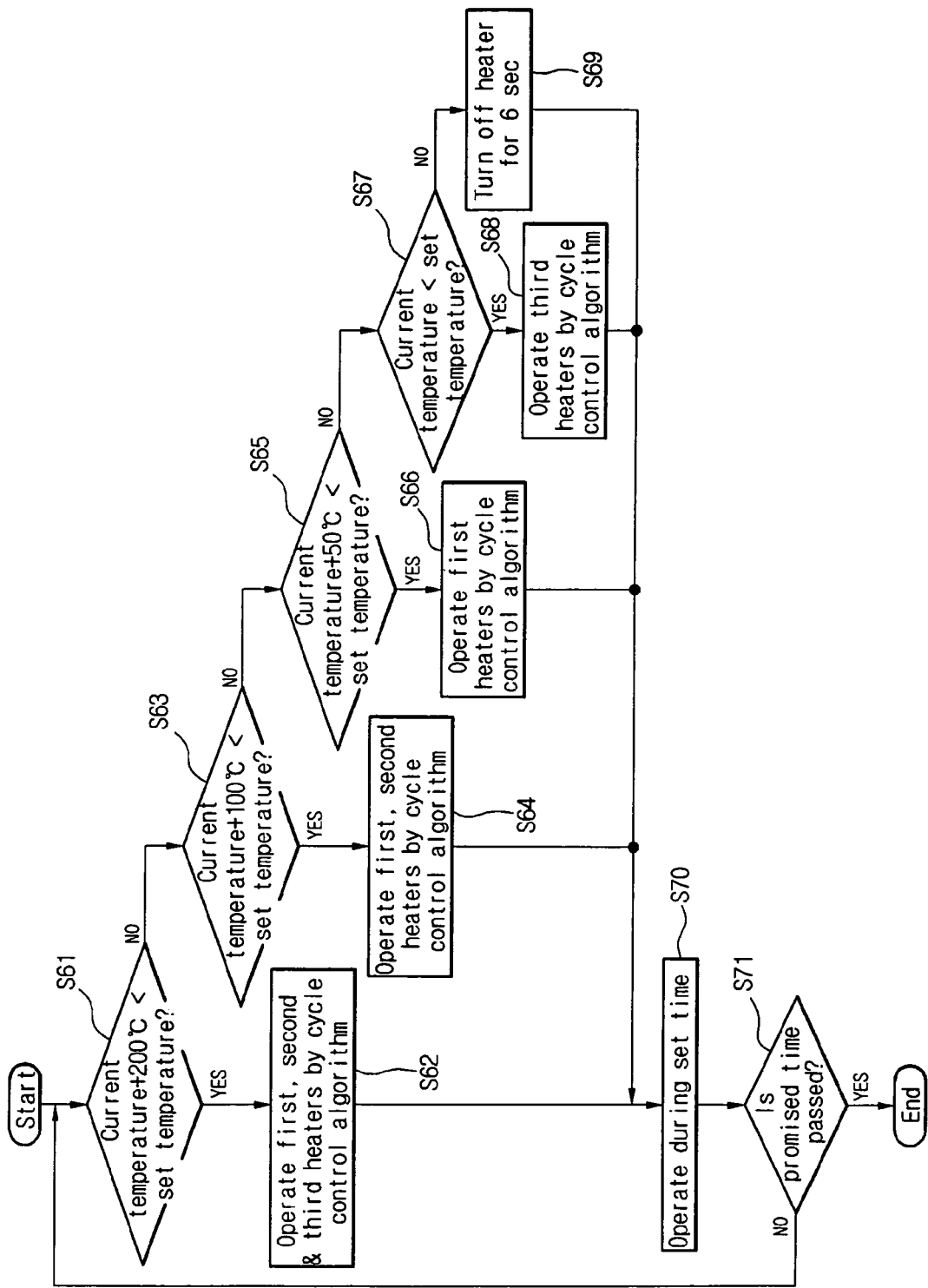
FIG. 3 is a flowchart for illustrating a method for controlling an electric oven with a plurality of heaters therein, according to the present invention.

FIG. 3 is a flowchart for illustrating a method of controlling an electric oven in case a plurality of heaters are installed in the electric oven. This flowchart shows a method for controlling operation of heaters in case a plurality of heaters are installed in the electric oven, and this embodiment exemplifies the case that three heaters are installed.

Referring to FIG. 3, there are four temperature comparison steps (S61)(S63)(S65)(S67) like the case of FIG. 2, and the controller 1 executes heater operation steps (S62)(S64) (S66)(S68)(S69) respectively depending on the comparison results conducted by the temperature comparison steps. Of course, a step of operating the heaters during a set time (S70) and a step of determining whether a cooking time is passed (S71) may be conducted in the same way as the case of FIG. 2. However, this embodiment is different from the former embodiment just for the point that the heater operation steps (S62)(S64)(S66)(S68)(S69) are conducted.

In detail, the kind of operated heaters is different according to the difference between a current temperature in the cavity and the set temperature, which is compared in the temperature comparison steps (S61)(S63)(S65)(S67). For example, all of the first, second and third heaters are operated according to the heater cycle control algorithm (S62) in case the difference between a current temperature in the cavity and the set temperature is greatest, the first and second heaters are operated according to the heater cycle control algorithm (S64) in case the difference between the current temperature in the cavity and the set temperature is great but less than the above case, only the first heater is operated according to the heater cycle control algorithm (S66) in case the difference between the current temperature in the cavity and the set temperature is less than the above case, and only the third heater is operated according to the heater cycle control algorithm (S68) in case the difference between the current temperature in the cavity and the set temperature is very small less than the above case. Of course, if the set temperature is less than the current temperature in the cavity, all heaters are turned off for a predetermined time (S69).

As described above, in case several heaters are turned on/off in the electric oven, a plurality of heaters are selectively turned on/off in consideration of the difference between a current temperature in the cavity and the set temperature, thereby increasing the temperature in the cavity rapidly up to an optimized level and keeping the optimized temperature for a long time accurately.

In addition, in case of several heaters are turned on/off, the heaters are operated in an alternate or simultaneous manner in consideration of the electric power so that a circuit breaker is not turned off and the temperature in the cavity may be controlled into an optimized state within a minimum time.

The present invention has a distinctive feature that operation time of one or several heaters installed in the electric oven is suitably controlled according to the difference between a current temperature in the cavity and the set temperature.

In detail, in a series of heater operation cycles for turning on/off heater(s), the heater-on time is suitably changed and adjusted continuously according to the difference between a current temperature in the cavity and the set temperature with keeping the heater-off time as it is so that the electric oven may keep its optimized temperature/humidity state.

There may be proposed another preferably embodiment by modifying the above embodiments. For example, the steps of comparing a current temperature in the cavity and the set temperature may be divided into more numbers according to the number of heaters. In detail, the heater control cycle may be classified into many steps, more than four steps proposed in FIG. 2. In addition, in case a plurality of heaters are applied, a heater state selected according to the number of heaters may be selected according to combination of the heaters. For example, in case three heaters are installed, seven combinations may be selected for the heaters in addition to one case that all heaters are turned off.

In addition, the heater-on time conducted in the heater operation steps (S50)(S70) may be changed according to usage of the electric oven. However, since the heater control algorithm is conducted whenever the heater operation time conducted in the heater operation step is passed, the heater-on time may be continuously increased. Thus, it is apparent that the heater operation cycle is continuously changed whenever the heater operation time is passed.

In addition, since the heater-off time is changed according to the difference between the set temperature and the current temperature in the cavity higher than the set temperature, it is possible to reach an optimized temperature more rapidly.

In addition, the set temperature may be set by a user in advance, or the set temperature may also be set automatically by a stored program in case the user selects a programmed cooking menu.

In addition, in case a plurality of heaters having different heating capacities in comparison to electric power are used, the heaters may be alternately or simultaneously operated though the same heating capacity is required.

INDUSTRIAL APPLICABILITY

As described above, the present invention enables to always keep a temperature in the cavity of the electric oven into an optimized state. Particularly, the internal state of the cavity may be kept in an optimized state regardless of an amount of foods in the cavity or a set temperature.

In addition, the same control method may be applied to other heating devices in addition to an electric oven for the purpose of keeping a suitable temperature/humidity state.

Moreover, since the electric oven is operated with an optimized electric power, the power interruption problem may be solved. In particular, the power supply in the oven may be safely operated, and malfunction of the oven may be prevented.

What is claimed is:

1. An apparatus for controlling an oven, comprising:
    an input unit for inputting a set temperature of the oven;
    at least one heater which operates with a variable heating on/off cycle, the variable heating on/off cycle including a heater-on time and a heater-off time; and
    a controller for adjusting the heating on/off cycle such that after the at least one heater operates for a current cycle period with a current heating on/off cycle, the controller generates a new heating on/off cycle by adjusting the heater-on time of the current heating on/off cycle based on a difference between a current temperature in the oven and the set temperature, the at least one heater operating with the new heating on/off cycle in a next cycle period.

2. The apparatus according to claim 1, wherein a heating-off time in the heating on/off cycle is fixed.

3. The apparatus according to claim 1, wherein the at least one heater includes a plurality of heaters, as a result of comparison between the current temperature in the oven and the set temperature, at least one of the heaters with greater heating capacity being turned on if a temperature difference is greater than a predetermined criterion, at least one of the heaters with smaller heating capacity being turned on if the temperature difference is smaller than the predetermined criterion.

4. The apparatus according to claim 1, wherein the at least one heater includes a plurality of heaters, as a result of comparison between the current temperature in the oven and the set temperature, all of the heaters being turned off for a predetermined time if the set temperature is lower than the current temperature in the oven.

5. The apparatus according to claim 1, wherein as a result of comparison between the current temperature in the oven and the set temperature, the heater-on time of the heater in the new heating on/off cycle is elongated as the set temperature is higher than the current temperature in the oven.

6. The apparatus according to claim 1, wherein, after the next cycle period is completed, the controller generates a second new heating on/off cycle by adjusting the heater-on time of the next heating on/off cycle based on a new difference between the current temperature in the oven and the set temperature.

7. The apparatus according to claim 1, wherein, as a result of comparison between the current temperature in the oven and the set temperature, the next heating on/off cycle is unchanged if the difference between the current temperature and the set temperature is not more than a predetermined criterion.

8. The apparatus according to claim 1, wherein the set temperature is manually set by a user.

9. The apparatus according to claim 1, further comprising a sensor for measuring the current temperature in the oven.

10. The apparatus according to claim 9, further comprising means for comparing the current temperature in the oven measured by the sensor and the set temperature and obtaining the difference between the current temperature in the oven and the set temperature.

11. The apparatus according to claim 10, wherein the controller includes means for adjusting the heater-on time of the current heating on/off cycle based on the difference between the current temperature in the oven and the set temperature obtained by the comparing means.

12. The apparatus according to claim 11, wherein the adjusting means adds one of a plurality of predetermined time periods to the heater-on time of the current heating on/off cycle as the heater-on time of the new heating on/off cycle when the difference between the current temperature in the oven and the set temperature is larger than a corresponding one of a plurality of predetermined values.

13. The apparatus according to claim 1, wherein the controller adds one of a plurality of predetermined time periods to the heater-on time of the current heating on/off cycle as the heater-on time of the new heating on/off cycle when the difference between the current temperature in the oven and the set temperature is larger than a corresponding one of a plurality of predetermined values.

14. A method for controlling an oven, comprising:
heating the oven by operating at least one heater with a current heating on/off cycle in a current cycle period, the current heating on/off cycle including a heater-on time and a heater-off time;
after the current cycle period is completed, generating a new heating on/off cycle by adjusting the heater-on time of the current heating on/off cycle based on a difference between a current temperature in the oven and a set temperature; and
operating the at least one heater with the new heating on/off cycle in a next cycle period.

15. The method according to claim 14, further comprising turning on the heaters as the current temperature in the oven is lower than the set temperature.

16. The method according to claim 14, further comprising turning on a heater with greater heating capacity among the heaters as the current temperature in the oven is lower than the set temperature.

17. The method according to claim 14, wherein, in the heating step, a plurality of heaters are alternately or simultaneously operated in consideration of electric power.

18. The method according to claim 14, wherein the heater-on time of the heater is adjusted after each heating on/off cycle is completed.

19. The method according to claim 14, wherein, in the heating step, the heaters to be operated are selected by a smaller number of combinations than the number of cases of a subset for the number of the heaters.

20. The method according to claim 14, wherein the generating step includes elongating the heater-on time of the heater in the new heating on/off cycle as the current temperature is lower than the set temperature.

21. The method according to claim 14, further comprising, after the next cycle period is completed, generating a second new heating on/off cycle by adjusting the heater-on time of the next heating on/off cycle based on a new difference between the current temperature in the oven and the set temperature.

22. The method according to claim 14, further comprising turning on all of the heaters for a predetermined time if the current temperature is higher than the set temperature.

23. The method according to claim 14, further comprising keeping the next heating on/off interval of the heater unchanged if the difference between the current temperature and the set temperature is not more than a predetermined criterion.

24. The method according to claim 14, wherein the step of generating the new heating on/off cycle includes adding one of a plurality of predetermined time periods to the heater-on time of the current heating on/off cycle to be the heater-on time of the new heating on/off cycle when the difference between the current temperature in the oven and the set temperature is larger than a corresponding one of a plurality of predetermined values.

25. An apparatus for controlling an oven, comprising:
an input unit for inputting a set temperature of the oven;
a plurality of heaters located in the oven, each of the heaters operating with a variable heating on/off cycle, the variable heating on/off cycle including a heater-on time and a heater-off time; and
a controller for selectively turning on/off the heaters based on a difference between a current temperature in the oven and the set temperature, when at least one of the heaters is selected to turn on, and for adjusting the heating on/off cycle such that after the at least one of the heaters operates for a current cycle period with a current heating on/off cycle, the controller generates a new heating on/off cycle by adjusting the heater-on time of the current heating on/off cycle based on the difference between the current temperature in the oven and the set temperature, the at least one of the heaters operating with the new heating on/off cycle in a next cycle period.

26. The apparatus according to claim 25, wherein the heating on time of the new heating on/off cycle is elongated as the set temperature is higher than the current temperature.

27. The apparatus according to claim 25, further comprising a sensor for measuring the current temperature in the oven.

28. The apparatus according to claim 27, further comprising means for comparing the current temperature in the oven measured by the sensor and the set temperature and obtaining the difference between the current temperature in the oven and the set temperature.

29. The apparatus according to claim 28, wherein the controller includes means for adjusting the heater-on time of the current heating on/off cycle based on the difference between the current temperature in the oven and the set temperature obtained by the comparing means.

30. The apparatus according to claim 29, wherein the adjusting means adds one of a plurality of predetermined time periods to the heater-on time of the current heating on/off cycle as the heater-on time of the new heating on/off cycle when the difference between the current temperature in the oven and the set temperature is larger than a corresponding one of a plurality of predetermined values.

31. The apparatus according to claim 25, wherein the controller adds one of a plurality of predetermined time periods to the heater-on time of the current heating on/off cycle as the heater-on time of the new heating on/off cycle when the difference between the current temperature in the oven and the set temperature is larger than a corresponding one of a plurality of predetermined values.

* * * * *